No. 637,105. Patented Nov. 14, 1899.
W. J. FITCH.
ROTARY FAN OR PADDLE WHEEL.
(Application filed Apr. 11, 1899.)
(No Model.) 3 Sheets—Sheet 1.
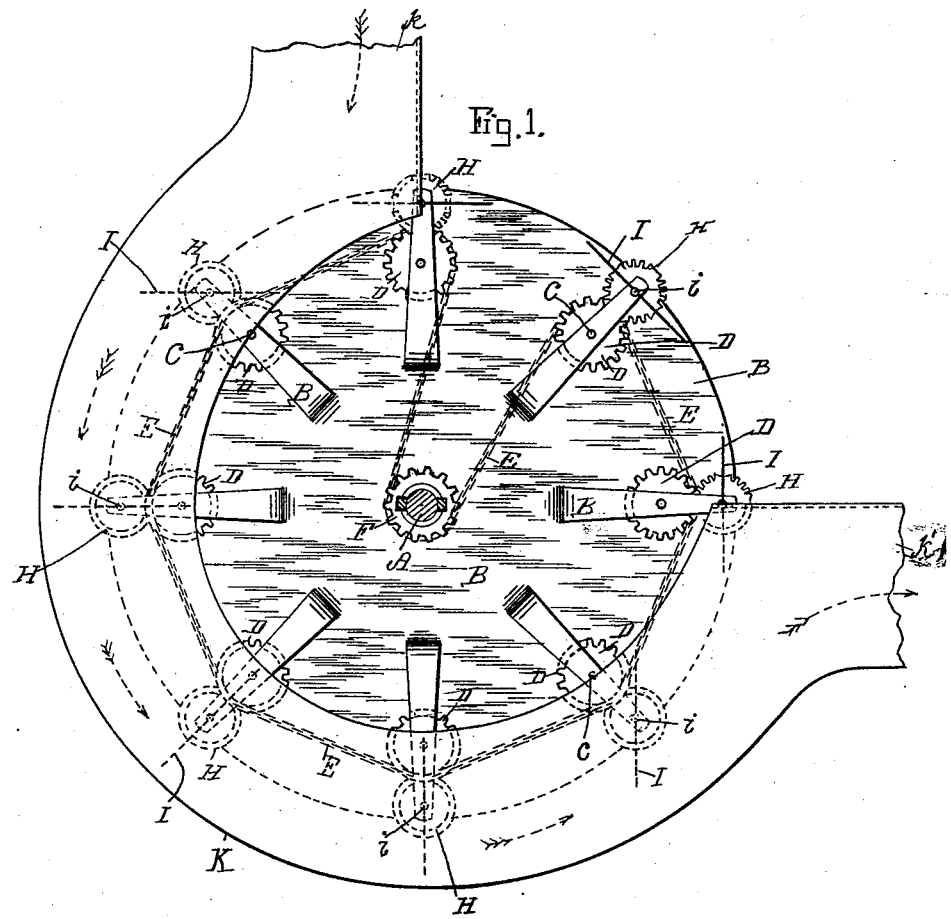
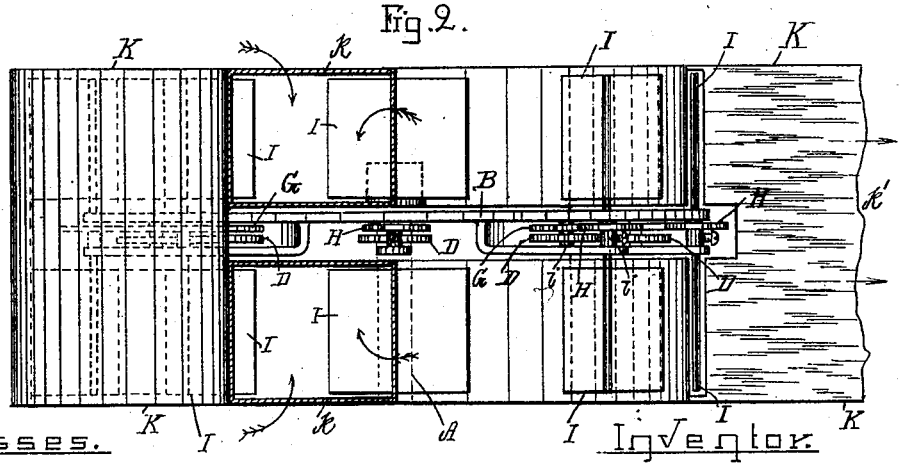
Witnesses. Inventor.
Lauritz N. Möller Watson J. Fitch
Mary C. Moller.
THE NORRIS PETERS CO., PHOTO-LITHO., WASHINGTON, D. C.

No. 637,105. Patented Nov. 14, 1899.
W. J. FITCH.
ROTARY FAN OR PADDLE WHEEL.
(Application filed Apr. 11, 1899.)
(No Model.) 3 Sheets—Sheet 2.
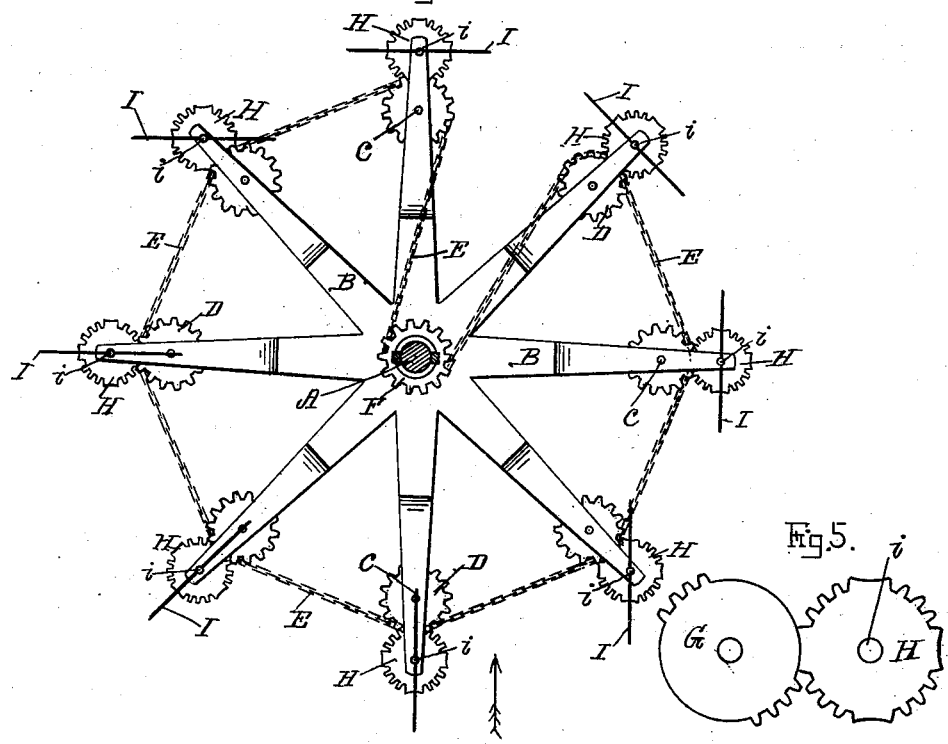
Fig. 3.
Fig. 5.
Fig. 6.
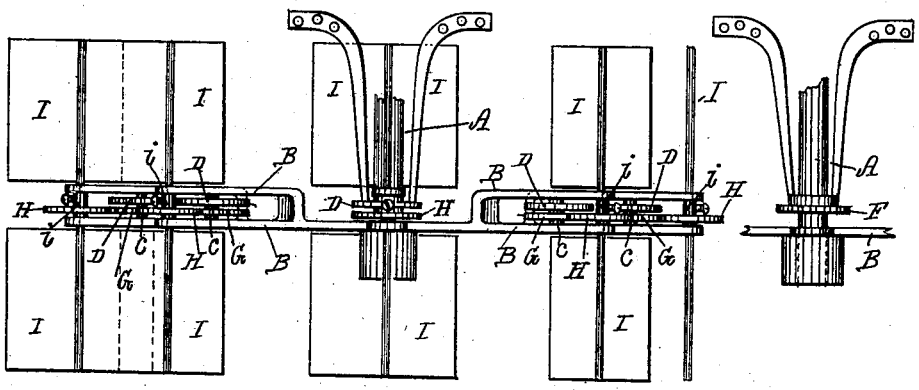
Fig. 4.
Witnesses.
Lauritz N. Möller
Mary C. Möller
Inventor.
Watson J. Fitch
THE NORRIS PETERS CO., PHOTO-LITHO., WASHINGTON, D. C.

No. 637,105. Patented Nov. 14, 1899.
W. J. FITCH.
ROTARY FAN OR PADDLE WHEEL.
(Application filed Apr. 11, 1899.)
(No Model.) 3 Sheets—Sheet 3.

Witnesses.
Lauritz N. Möller
Mary C. Möller

Inventor.
Watson J. Fitch

UNITED STATES PATENT OFFICE.

WATSON J. FITCH, OF BOSTON, MASSACHUSETTS.

ROTARY FAN OR PADDLE WHEEL.

SPECIFICATION forming part of Letters Patent No. 637,105, dated November 14, 1899.

Application filed April 11, 1899. Serial No. 712,590. (No model.)

*To all whom it may concern:*

Be it known that I, WATSON J. FITCH, a citizen of the United States, residing at Boston, in the county of Suffolk and State of Massachusetts, have invented new and useful Improvements in Rotary Fan or Paddle Wheels, of which the following is a specification.

This invention relates to rotary fan or paddle wheels or blowers, and has for its chief object to provide a new and improved fan or paddle wheel wherein a plurality of fans or paddles are intermittingly rotated to obtain the least and the greatest resistance where desired. This object is accomplished in the manner and by the means hereinafter described and claimed, reference being made to the accompanying drawings, in which—

Figure 7:
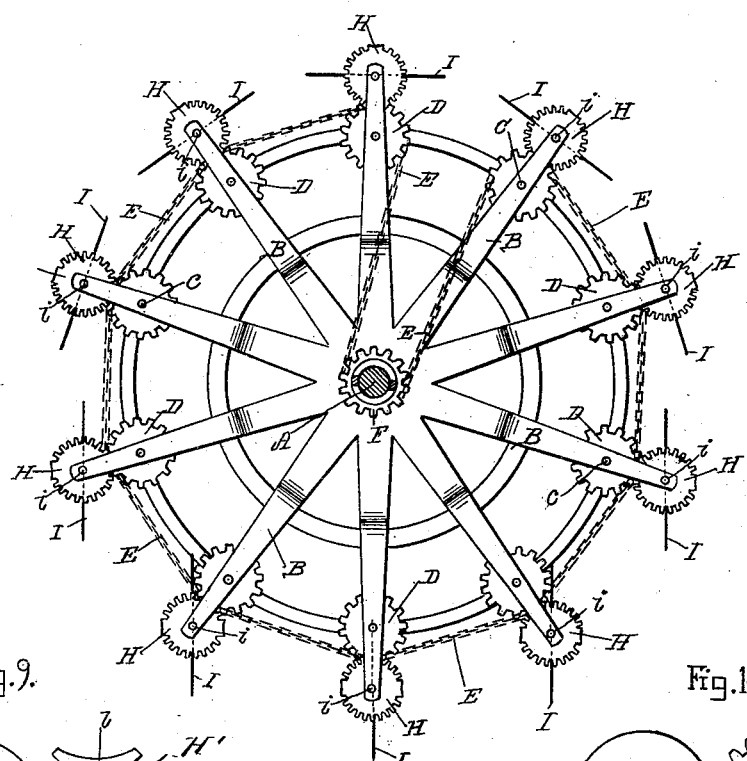
Figure 9:
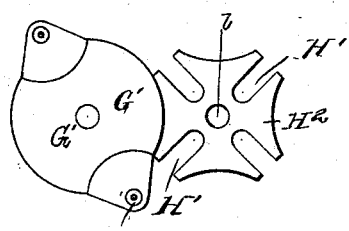
Figure 10:
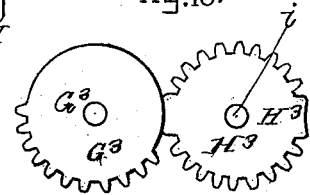
Figure 8:
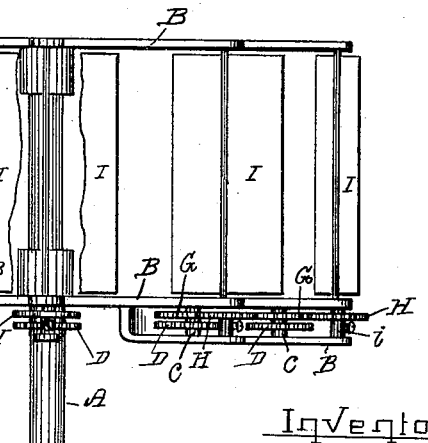

Figure 1 represents a side elevation of the improved rotary fan or air-blower. Fig. 2 represents a top plan view of the same. Fig. 3 represents a detail side elevation of the rotary fan-wheel. Fig. 4 represents a bottom plan view of Fig. 3. Fig. 5 represents an enlarged detail side view of one of the pairs of gears for intermittingly rotating the fans or paddles. Fig. 6 represents a top plan view of the fan-shaft bearing and stationary sprocket-wheel. Fig. 7 represents a side elevation of a modification of the rotary fan-wheel, showing it as adapted for use as a paddle-wheel, water-wheel, or windmill. Fig. 8 represents a top plan view of Fig. 7. Fig. 9 represents a side elevation of a modified form of the gears for intermittingly rotating the fans or paddles, and Fig. 10 is a similar view showing another modification in the construction of said gears adapted for the wheel shown in Fig. 7.

Similar letters refer to similar parts wherever they occur on the different parts of the drawings.

In Fig. 1, A represents the wheel-shaft journaled in a suitable bearing, and to such shaft is secured the wheel or wheel-frame B, which may be solid, as shown in Figs. 1 and 2, or skeleton form, as represented in Figs. 3 and 4.

The outer portion of the wheel-frame is preferably forked, as shown in Figs. 2 and 4, and in the forked ends of such wheel-frame are journaled axles C C, to which are secured sprocket-wheels D D, with which an endless chain E engages, said chain being carried around a stationary sprocket-wheel F, arranged axially in a line with the center of the wheel-shaft A, as shown. To the axle of each of the sprocket-wheels D is secured a mutilated driving-gear G, engaging a corresponding mutilated driven gear H, secured to the fan or paddle shaft $i$, that is journaled in the outer forked portion of the wheel-frame and has secured to it a fan or paddle I, as shown. The rotation of the wheel-frame causes the endless chain to rotate the sprocket-wheels D and the gears G; but by reason of the mutilated construction of the gears G and H the latter are turned only at intervals. It will thus be seen that when a rotary motion is imparted to the wheel-frame intermittent rotary motion is imparted to the wings or fans I by the stationary sprocket-wheel F, endless chain E, sprocket-wheels D, and the gear-wheels G and H, thereby causing the fans or paddles I to vary their positions during the rotation of the wheel-frame, so as to pass with least resistance when so desired and so as to obtain the greatest resistance when so desired.

The wheel and its intermittently-rotating fans or paddles are made to rotate in a segmental flue K, causing the air to be drawn in at $k$ and ejected at $k'$ during the rotation of the device. The wings or fans I as they enter the flue K are held in a horizontal position, and when they leave such flue they are held in a vertical position, as shown in Fig. 1.

In Figs. 7 and 8 the device is shown adapted for use as a windmill or paddle or water wheel, and for this purpose I prefer to make the wheel-frame duplex, with end bearings for the fans, instead of a central frame having a middle bearing for the fans or paddles, as shown in Fig. 2.

The mutilated gears for intermittingly rotating the fans or paddles as the wheel-frame turns may be of the form shown in Fig. 5 or constructed as shown in Figs. 9 and 10. In Fig. 5 the gear G is provided with two sections of teeth arranged diametrically opposite each other and coöperating with four separated sections of teeth on the periphery of gear H.

In Fig. 9 the gear G' is constructed with diametrically opposite pins $G^2$ to coöperate with four radial slots H' in the gear $H^2$.

In Fig. 10 the gear G³ is provided with a single section of teeth coöperating with two separated sections of teeth on the gear H³, as will be obvious.

What I wish to secure by Letters Patent and claim is—

1. The combination of a rotatable wheel-frame, a series of sprocket-wheels and fans or paddles mounted in the outer portion of the wheel-frame, an endless chain engaging the sprocket-wheels, means for causing the chain to travel as the wheel-frame rotates, and devices actuated by the sprocket-wheel axles and operating, substantially as described, to intermittingly rotate the fans or paddles.

2. The combination of a wheel-frame, a series of sprocket-wheels in the outer portion of the wheel-frame, an endless chain engaging the sprocket-wheels, means for causing the chain to travel as the wheel-frame turns, to rotate the sprocket-wheels, a series of fans or paddles, and mutilated gears operated by the sprocket-wheel axles to intermittingly rotate the fans or paddles, substantially as described.

In testimony whereof I have hereunto set my hand in presence of two subscribing witnesses.

WATSON J. FITCH.

Witnesses:
ALBAN ANDRÉN,
LAURITZ N. MÖLLER.